US011107086B2

(12) United States Patent
Fenton et al.

(10) Patent No.: US 11,107,086 B2
(45) Date of Patent: Aug. 31, 2021

(54) RETAIL FINANCIAL SYSTEM TESTING SYSTEM AND METHODS

(71) Applicant: Walmart Apollo, LLC, Bentonville, AR (US)

(72) Inventors: Timothy M. Fenton, Bentonville, AR (US); Christopher D. Johnson, Bentonville, AR (US); Joel E. Strader, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 431 days.

(21) Appl. No.: 15/852,482

(22) Filed: Dec. 22, 2017

(65) Prior Publication Data

US 2018/0181960 A1 Jun. 28, 2018

Related U.S. Application Data

(60) Provisional application No. 62/438,506, filed on Dec. 23, 2016.

(51) Int. Cl.
| | | |
|---|---|---|
| *G06Q 20/40* | (2012.01) | |
| *G06Q 20/34* | (2012.01) | |
| *G06Q 20/20* | (2012.01) | |

(52) U.S. Cl.
CPC ......... *G06Q 20/4093* (2013.01); *G06Q 20/20* (2013.01); *G06Q 20/34* (2013.01); *G06Q 20/405* (2013.01)

(58) Field of Classification Search
CPC .... G06Q 20/4093; G06Q 20/20; G06Q 20/34; G06Q 20/202; G06Q 20/204; G06Q 20/405; G07G 1/0009; G07G 1/14
See application file for complete search history.

(56) References Cited

U.S. PATENT DOCUMENTS 3,852,815 A 12/1974 Forshtator
5,438,186 A 8/1995 Nair
(Continued)

FOREIGN PATENT DOCUMENTS

CA 2763886 4/2012
CN 103679970 3/2014
(Continued)

OTHER PUBLICATIONS

Andrea Townrow , "HDI Robotic Arm Testing ATM", Apr. 24, 2014, https://www.youtube.com/watch?v=nQD-NACYrM0 (Year: 2014).*

(Continued)

*Primary Examiner* — Florian M Zeender
*Assistant Examiner* — Vanessa Deligi
(74) *Attorney, Agent, or Firm* — Fitch, Even, Tabin & Flannery LLP

(57) ABSTRACT

In some embodiments, apparatuses and methods are provided herein useful to testing retail financial system transactions. In some embodiments, a system comprises an automated robotic testing device configured to retrieve a selected card from a physical media library, interact, via the selected card, with a point-of-sale terminal, the point-of-sale terminal configured to receive from the selected card, information associated with the selected card, and transmit, to an external banking institution, the information, and a control circuit configured to determine the selected card, transmit, to the automated robotic testing device, the indication of the selected card, receive one of an authorization and a lack of authorization, in response to receipt of 1) authorization, cause the transaction to be completed, and 2) the lack of authorization, cause the transaction to be voided, determine whether a test associated with the transaction was successful, and log an indication of whether the test was successful.

20 Claims, 3 Drawing Sheets

(56) References Cited

U.S. PATENT DOCUMENTS

| | | | |
|---|---|---|---|
| 5,577,197 A * | 11/1996 | Beck | G06F 11/3414 |
| | | | 714/28 |
| 5,760,383 A | 6/1998 | Heske, III | |
| 6,719,199 B1 | 4/2004 | Cotten | |
| 6,783,064 B1 * | 8/2004 | Green | G06Q 20/1085 |
| | | | 235/375 |
| 6,785,845 B2 | 8/2004 | Venkataraman | |
| 6,793,141 B1 | 9/2004 | Graham | |
| 6,978,930 B2 | 12/2005 | Harding | |
| 7,156,292 B2 | 1/2007 | Silverbrook | |
| 7,613,634 B2 | 11/2009 | Siegel | |
| 8,132,713 B2 | 3/2012 | Kekicheff et al. | |
| 8,329,051 B2 | 12/2012 | Fu | |
| 8,376,239 B1 | 2/2013 | Humphrey | |
| 8,453,931 B2 | 6/2013 | Chiou | |
| 8,824,083 B1 | 9/2014 | Kientz | |
| 8,944,332 B2 | 2/2015 | Harding | |
| 8,955,752 B2 | 2/2015 | Chiou | |
| 9,569,765 B2 | 2/2017 | Cancro | |
| 9,607,201 B1 | 3/2017 | Schafer | |
| 10,181,120 B1 * | 1/2019 | Holmes | G06Q 20/204 |
| 10,181,224 B2 * | 1/2019 | Somani | G07B 5/08 |
| 10,242,357 B1 * | 3/2019 | Dorogusker | G06Q 20/20 |
| 10,318,850 B1 * | 6/2019 | Gosalia | G06Q 20/00 |
| 10,713,639 B2 * | 7/2020 | Gorenstein | G06Q 20/4016 |
| 2001/0034623 A1 | 10/2001 | Chung | |
| 2002/0029342 A1 * | 3/2002 | Keech | G06Q 20/382 |
| | | | 713/184 |
| 2002/0092914 A1 | 7/2002 | Pentz | |
| 2004/0060984 A1 * | 4/2004 | Connelly | G06K 13/10 |
| | | | 235/441 |
| 2005/0127173 A1 * | 6/2005 | Idol, Jr. | G06Q 20/20 |
| | | | 235/383 |
| 2005/0274801 A1 | 12/2005 | Harding | |
| 2007/0284449 A1 | 12/2007 | Yuen | |
| 2008/0022400 A1 * | 1/2008 | Cohen | G06F 21/554 |
| | | | 726/22 |
| 2008/0105749 A1 | 5/2008 | Lei | |
| 2009/0077675 A1 * | 3/2009 | Cabouli | G07F 7/0866 |
| | | | 726/34 |
| 2009/0271764 A1 * | 10/2009 | Gonzales, II | G06F 11/3696 |
| | | | 717/115 |
| 2011/0073647 A1 | 3/2011 | Chiou | |
| 2015/0170138 A1 * | 6/2015 | Rao | G06Q 20/4012 |
| | | | 705/41 |
| 2016/0034723 A1 * | 2/2016 | Somani | G06Q 10/00 |
| | | | 235/438 |
| 2016/0098878 A1 * | 4/2016 | Cabouli | H04L 63/0853 |
| | | | 340/5.52 |
| 2016/0203456 A1 | 7/2016 | Herring | |
| 2017/0200148 A1 * | 7/2017 | Ulrich | G06Q 20/401 |
| 2019/0329413 A1 * | 10/2019 | Johnson | B25J 9/1697 |

FOREIGN PATENT DOCUMENTS

| | | |
|---|---|---|
| CN | 105321269 | 2/2016 |
| CN | 206311714 | 7/2017 |
| CN | 107169387 A | 9/2017 |
| JP | H02297721 A | 12/1990 |
| WO | 1999028851 | 6/1999 |
| WO | 2014056118 | 4/2014 |

OTHER PUBLICATIONS

Abrantix AG; "EFTPOS Card and PIN Robot for Automated Testing"; https://www.youtube.com/watch?v=SAwMnx8Vdb8; published Mar. 21, 2016; pp. 1-6.

Demaitre, Eugene; "POS Testing Goes Robotic With Rhiscom Automaton"; Robotic Business Review; published Apr. 28, 2016; pp. 1-6.

Grupohdi; "Testing POS Using Robotics"; https://www.youtube.com/watch?v=2RCDO64ZuJ8; published Apr. 3, 2013; pp. 1-4.

UL Transaction Security; "UL Terminal Test Station"; https://www.youtube.com/watch?v=23a9iavWH3o; published on Sep. 2, 2016; pp. 1-5.

PCT; App. No. PCT/US17/67499; International Search Report and Written Opinion dated Mar. 8, 2018.

"Free Online Barcode Generator: Create Barcodes for Free!"; http://barcode.tecit.com/en; printed Apr. 28, 2016; pp. 1-2.

PCT; App. No. PCT/US2018/061413; International Search Report dated Jan. 25, 2019.

PCT; App. No. PCT/US2018/061988; International Search Report and Written Opinion dated Feb. 21, 2019.

U.S. Appl. No. 16/198,056; Notice of Allowance dated Aug. 19, 2019; (pp. 1-19).

U.S. Appl. No. 16/198,289; Notice of Allowance dated Aug. 23, 2019; (pp. 1-9).

* cited by examiner

RETAIL FINANCIAL SYSTEM TESTING SYSTEM AND METHODS

CROSS-REFERENCE TO RELATED APPLICATION

This application claims the benefit of U.S. Provisional Application No. 62/438,506, filed Dec. 23, 2016, which is incorporated by reference in its entirety herein.

TECHNICAL FIELD

This invention relates generally to robotic testing equipment and, more particularly, to robotic testing equipment for financial transactions.

BACKGROUND

Completing a financial transaction requires a number of actors to work together. For example, a retailer collects information associated with a credit card, an intermediary, such as an acquirer, determines what bank issued the credit card and transmits the information associated with the credit card to the bank, the bank authorizes the transaction, and the retailer completes the transaction. Because of the complexity of completing a financial transaction, specifically a cashless transaction, there are many places where problems can occur. Testing a financial system can also be difficult due to the number of actors involved. For example, banks are reluctant to provide third parties with the information necessary to authorize a transaction (e.g., the hash or key used to determine the validity of the transaction). Consequently, a need exists for a system that can test a retail financial system and obviate the need for the information necessary to authorize a transaction.

BRIEF DESCRIPTION OF THE DRAWINGS

Disclosed herein are embodiments of systems, apparatuses, and methods pertaining to testing a retail financial system. This description includes drawings, wherein.

Figure 1:
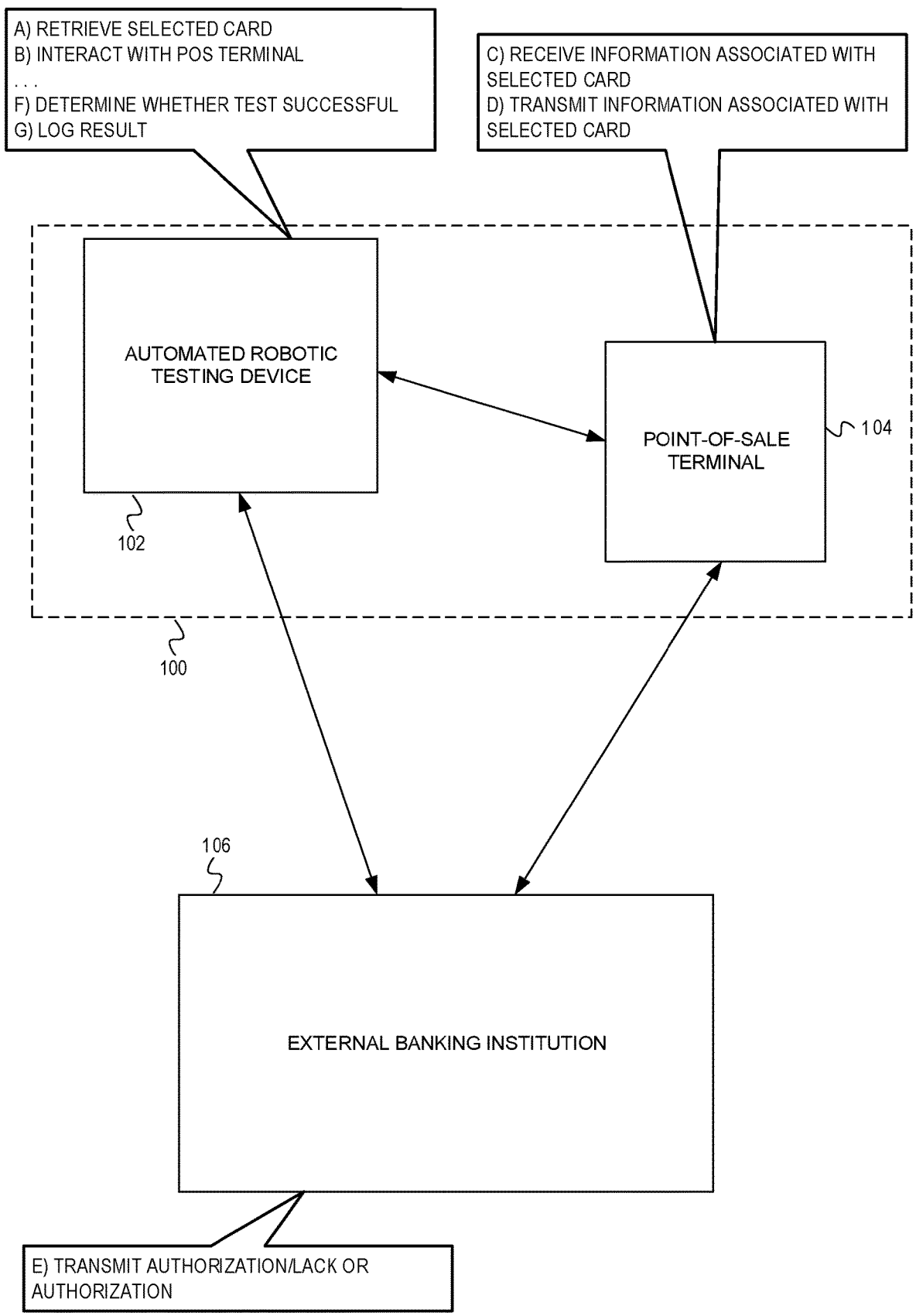
FIG. 1 depicts a system 100 for testing a retail financial system, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to testing retail financial system transactions. In some embodiments, a system comprises an automated robotic testing device, the automated robotic testing device configured to retrieve, based on an indication of a selected card, the selected card from a physical media library, interact, via the selected card, with a point-of-sale terminal, the physical media library configured to hold a plurality of cards, the point-of-sale terminal communicatively coupled to a financial network and configured to receive from the selected card, information associated with the selected card, and transmit, via the financial network to an external banking institution, the information associated with the selected card, and a control circuit configured to determine, based on a transaction type, the selected card, transmit, to the automated robotic testing device, the indication of the selected card, receive, from the external banking institution in response to the transmission of the information associated with the selected card, one of an authorization and a lack of authorization, in response to receipt of the authorization, cause the transaction to be completed, in response to receipt of the lack of authorization, cause the transaction to be voided, determine whether a test associated with the transaction was successful, and log an indication of whether the test was successful.

As previously discussed, a financial transaction, such as a cashless transaction, online or in a retail establishment, requires a number of actors. Because completion of the action requires a number of actors, multiple systems must be able to exchange information for the financial system to function properly. Testing the system allows for the discovery of problems and the system to be modified, if necessary, to function properly.

Additionally, some retailers are performing roles in-house that were once performed by a third party. For example, a retailer may complete the steps of an acquirer in-house in an effort to reduce the costs associated with cashless transactions (e.g., credit, debit, Apple Pay, Android Pay, etc. transactions—referred to herein generally as "credit card transactions" for ease of reading) incurred by the retailer. If a retailer is performing operations beyond simply transmitting payment information (e.g., credit card numbers), it can be even more important that the retailer thoroughly test the retail financial system.

To test the entirety of the retail financial system (i.e., the retailer's portion of the system, the acquirer's portion of the system, and the bank's (i.e., issuer's) portion of the system), the retailer must process and authorize the credit card transactions. Unfortunately, retailers typically do not have access to the information necessary to authorize a transaction (e.g., a key or hash), and banks are hesitant to provide the information to third parties due to security and privacy concerns.

Described herein is a testing system that seeks to overcome these difficulties so that a retail financial system transaction can be tested without the need for the information necessary to authorize a transaction. In some embodiments, the testing system tests the retail financial system using real credit cards (i.e., credit cards with which transactions can be authorized, also referred to as "live transactions," as oppose to dummy or fake transactions that cannot be used to purchase goods and/or services) to obviate the need for the information necessary to authorize a transaction. The discussion of FIG. 1 provides an overview of such a system.

FIG. 1 depicts a system 100 for testing a retail financial system, according to some embodiments. The system 100 includes an automated robotic testing device 102 and a point-of-sale (POS) terminal 104. The automated robotic testing device 102 and the POS terminal 104 interact with an external banking institution 106 to test the retail financial system. The automated robotic testing device 102 interacts with the point-of-sale terminal 104 to complete financial transactions with the external banking institution 106. FIG. 1 depicts operations at stages A-G. The stages are examples and are not necessarily discrete occurrences over time (e.g., the operations of different stages may overlap). Additionally, FIG. 1 is an overview of example operations.

At stage A, the automated robotic testing device 102 retrieves the selected card. The card is selected based on a type of transaction. The type of transaction can be based on one or more of a credit card transaction, a debit card transaction, a gift card transaction, a bank, verification required by a transaction, an input type, a geographic location, etc. For example, the type of transaction can be a credit card transaction with a card issued by Bank X which has a chip and requires a signature. In this example, the selected card will be a credit card issued by Bank X which has a chip and is for an amount which requires a signature. Accordingly, the automated robotic testing device 102 retrieves the credit card issued by Bank X which has a chip. In some embodiments, the cards are stored in a physical media library designed to allow the automated robotic testing device 102 to easily retrieve the cards. For example, the physical media library can be designed so that when the cards are returned to the physical media library, they are aligned in a default position. The automated robotic testing device 102 has at least one end effector with which it retrieves the card. Additionally, the selected card may be multiple cards (e.g., two or more cards).

At Stage B, the automated robotic testing device 102 interacts with the POS terminal 104 via the selected card. The automated robotic testing device 102 interacts with the POS terminal 104 by swiping, tapping, or dipping the selected card. Additionally, in some embodiments, the automated robotic testing device 102 actuates hard/and or soft buttons on, or associated with, the POS terminal 104 as well as provides a signature in an area of, or associated with, the POS terminal 104.

At Stage C, the POS terminal 104 receives information associated with the selected card. The POS terminal 104 receives the information from the selected card when the automated robotic testing device 102 swipes, dips, or taps the selected card. The information associated with the selected card includes the information necessary to authorize a transaction with the selected card. For example, the information associated with the selected card can include a credit card number, a debit card number, a gift card number, a PIN number, a number or code based on a credit card or debit card number, or any other suitable information.

At Stage D, the POS terminal 104 transmits the information associated with the selected card to the external banking institution 106. The POS terminal 104 can transmit the information associated with the selected card directly to the external banking institution 106, or through an intermediary, such as an acquirer (whether third party or in-house). The POS terminal 104 transmits the information associated with the selected card over a financial network.

At Stage E, the external banking institution 106 transmits an authorization or a lack of authorization. The external banking institution 106 can transmit the authorization or lack of authorization to the automated robotic testing device 102 or the POS terminal 104. After receiving the information associated with the selected card, the external banking institution 106 determines whether the transaction should be authorized. After making this determination, the external banking institution 106 transmits the authorization or lack of authorization.

At Stage F, the automated robotic testing device 102 determines whether the test was successful. For example, the automated robotic testing device 102 can compare the authorization or lack thereof to an expected outcome. If the authorization or lack thereof matches the expected outcome, the test was successful.

At Stage G, the automated robotic testing device 102 logs a result of the test. That is, the automated robotic testing device 102 records whether the test was successful. The results can be stored in a database, retests can be performed based on the results, and/or notifications can be transmitted based on the results.

Figure 2:
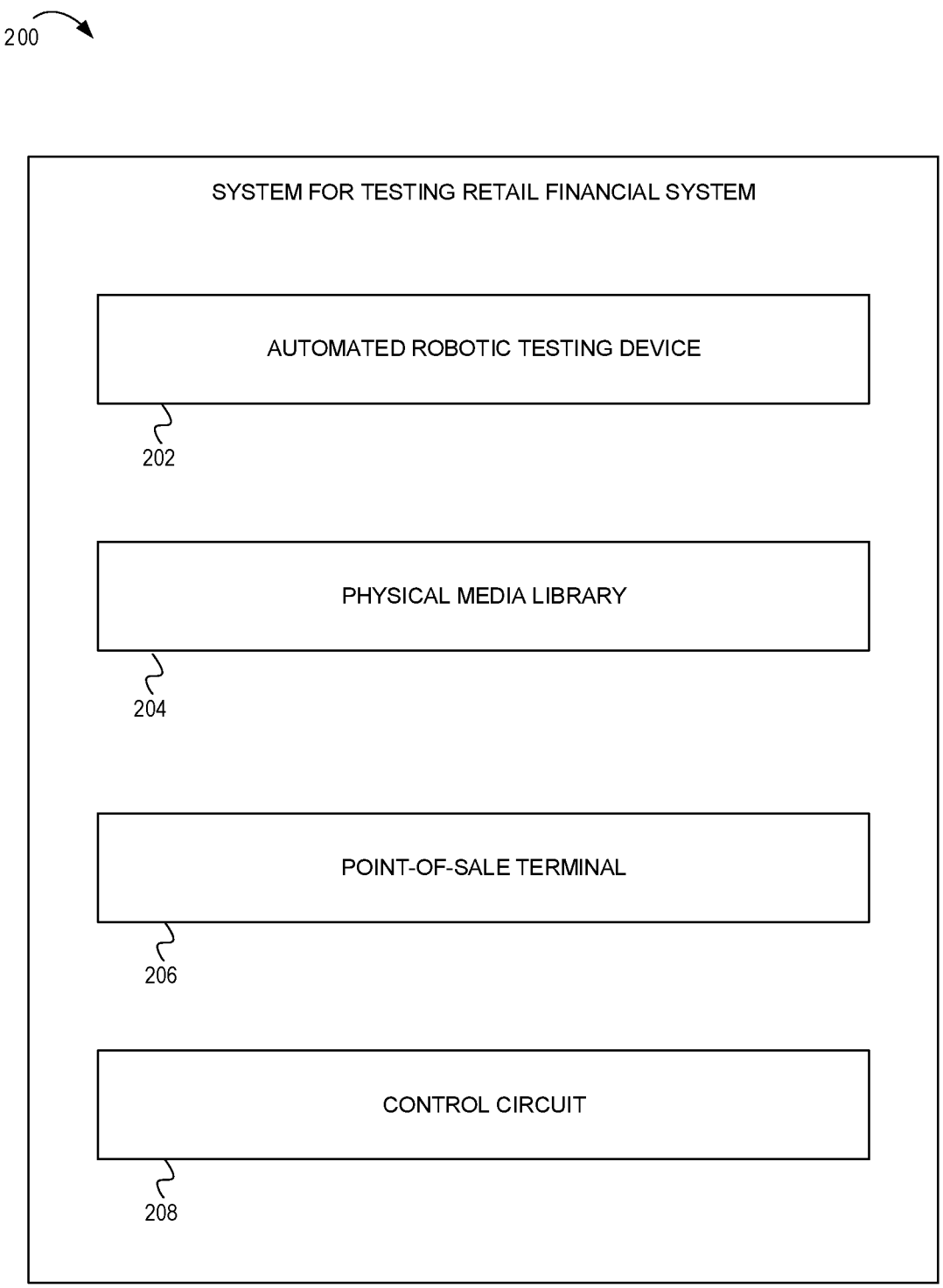
FIG. 2 is a block diagram of a system 200 for testing a retail financial system, according to some embodiments.

While the discussion of FIG. 1 provides background information regarding a system for testing a retail financial system, the discussion of FIG. 2 provides additional information regarding an example system for testing a retail financial transaction.

FIG. 2 is a block diagram of a system 200 for testing a retail financial system, according to some embodiments. The system 200 includes an automated robotic testing device 202, a physical media library 204, a POS terminal 206, and a control circuit 208. The automated robotic testing device 202 can be any type of device suited for interacting with the physical media library 204 and the POS terminal 206. For example, the automated robotic testing device 202 can be a robot including one or more end effectors that are configured to grasp and retrieve cards from the physical media library 204. The automated robotic testing device 202 interacts with the POS terminal 206 via the cards. For example, the automated robotic testing device 202 interacts with the POS terminal 206 by swiping, tapping, and/or dipping the cards. The cards are real credit, debit, gift, etc. cards with which live transactions can be performed. In some embodiments, the term cards can also refer to devices that differ from traditional credit, debit, and gift cards, such as mobile devices.

The POS terminal 206 receives information associated with the card from the card during the interaction with the automated robotic testing device 202. The information associated with the card includes the information necessary to authorize a transaction with the card. For example, the information associated with the card can include a credit card number, a debit card number, a gift card number, a PIN number, a number or code based on a credit card or debit card number, or any other suitable information. The POS terminal 206 is communicatively coupled to a financial network over which the POS terminal 206 communicates. For example, the POS terminal 206 can transmit the information associated with the card to an external banking institution of approval or lack of approval.

The control circuit 208 performs operations for the system 200 to test the retail financial system. For example, the control circuit 208 determines the card to be used for the test (i.e., the selected card), transmits an indication of the selected card to the automated robotic testing device 202, selects the external banking institution, receives authorizations and lack of authorizations from the external banking institution, causes transaction to be completed, causes transactions to be voided, and logs indications of whether the tests are successful.

The control circuit 208 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 208 is configured (for example, by using corresponding programming as will be well understood by those skilled in the art) to carry out one or more of the steps, actions, and/or functions described herein.

By one optional approach the control circuit 208 operably couples to a memory. The memory may be integral to the control circuit 208 or can be physically discrete (in whole or in part) from the control circuit 208 as desired. This memory can also be local with respect to the control circuit 208 (where, for example, both share a common circuit board, chassis, power supply, and/or housing) or can be partially or wholly remote with respect to the control circuit 208 (where, for example, the memory is physically located in another facility, metropolitan area, or even country as compared to the control circuit 208).

This memory can serve, for example, to non-transitorily store the computer instructions that, when executed by the control circuit 208, cause the control circuit 208 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

Figure 3:
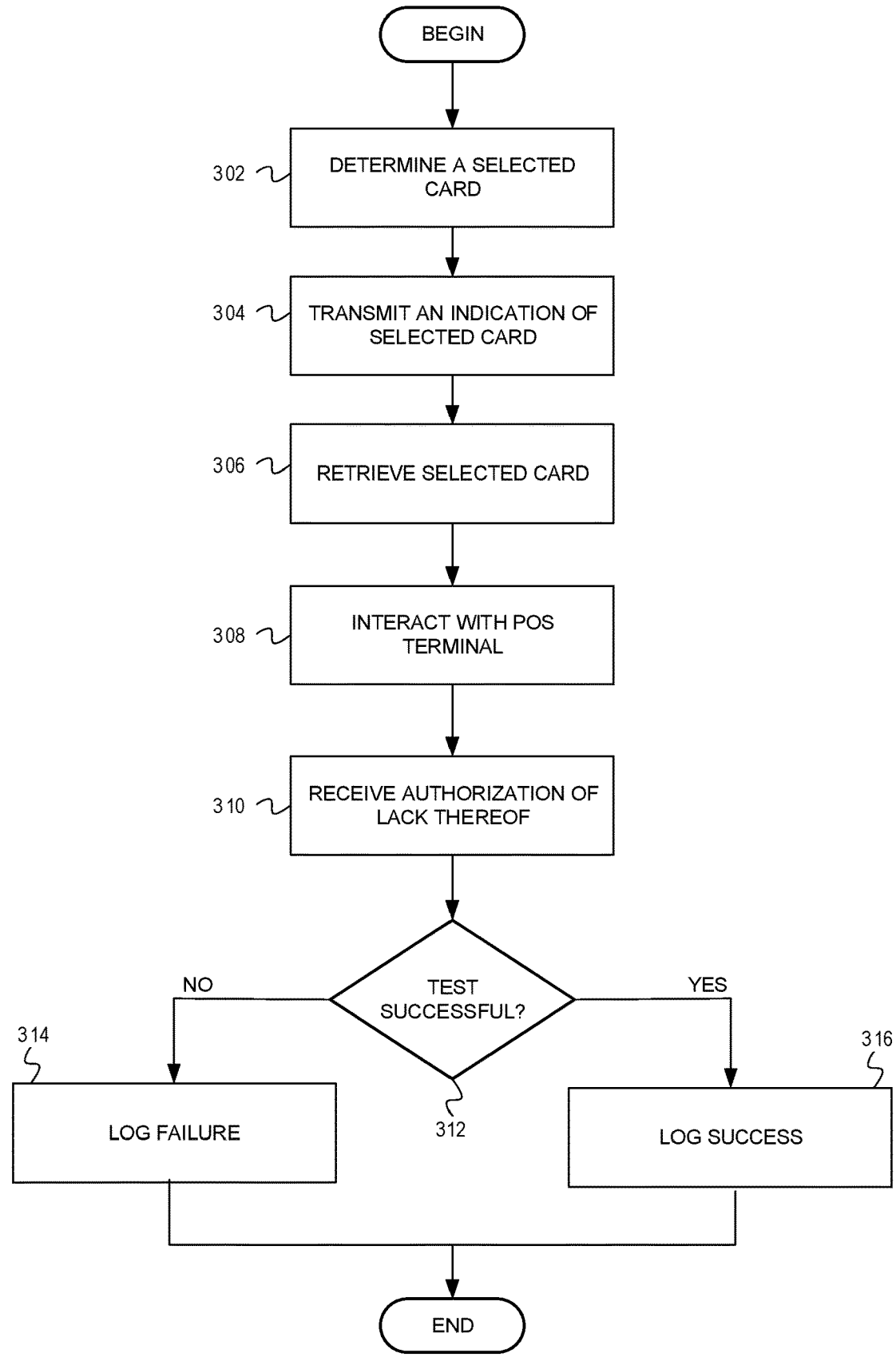
FIG. 3 is a flow chart depicting example operations for testing a retail financial system, according to some embodiments.

While the discussion of FIG. 2 provides additional information regarding an example system for testing a retail financial transaction, the discussion of FIG. 3 describes example operations for testing a retail financial system.

FIG. 3 is a flow chart depicting example operations for testing a retail financial system, according to some embodiments. The flow begins at block 302.

At block 302, a selected card is determined. For example, a control circuit can determine a selected card. The selected card can be determined based on a type of a transaction. The type of transaction can be based on one or more of a credit card transaction, a debit card transaction, a gift card transaction, a bank, verification required by a transaction, an input type, a geographic location, etc. The cards can be selected to test specific types of transactions, to try a variety of transactions, or randomly chosen. The flow continues at block 304.

At block 304, an indication of the selected card is transmitted. For example, the control circuit can transmit the indication of the selected card to an automated robotic testing device. The control circuit can be located locally to, or remotely from, the automated robotic testing device. For example, the control circuit can be located in the same location, or on, the automated robotic testing device or located in a different area or region than the automated robotic testing device (e.g., a centralized control circuit that determines selected cards for a number of automated robotic testing devices). The flow continues at block 306.

At block 306, the selected card is retrieved. For example, the automated robotic testing device can retrieve the selected card with one or more end effectors and/or attachments. In some embodiments, the cards are stored in a physical media library that is configured to store the cards so that the automated robotic testing device can easily retrieve the cards, for example, in a grid system. The flow continues at block 308.

At block 308, a POS terminal is interacted with. For example, the automated robotic testing device can interact with the POS terminal via the selected card. The automated robotic testing device interacts with the POS terminal via the selected card by swiping, dipping, and/or tapping the selected card. In some embodiments, when necessary, the automated robotic testing device also interacts with the POS terminal via hard and/or soft burtons and signature pads. For example, the automated robotic testing device can enter a PIN, select options, and/or provide a signature in association with a transaction. The flow continues at block 310.

At block 310, an authorization or lack of authorization is received. For example, the control circuit can receive an authorization or lack thereof from an external banking institution. The authorization indicates whether the transaction is approved. During testing, the system for testing a retail financial system can conduct transactions that should, and should not, be authorized, to test different possible outcomes. The flow continues at decision diamond 312.

At decision diamond 312, it is determined whether the test was successful. For example, the control circuit can determine whether the test was successful. In some embodiments, the test is successful if the expected result is achieved. For example, the if the control circuit selects a card that, based on the items to be purchased, should result in an authorization, the test is successful if an authorization is received. As another example, if the control circuit selects a card and instructs the automated robotic testing device to enter an incorrect PIN and an authorization is received, the test was not successful (i.e., the test was not successful because inputting an incorrect PIN should have resulted in a lack of authorization). If the test is successful, the flow continues at block 316. If the test is not successful, the flow continues at block 314.

At block 314, if the test was not successful, an indication that the test was not successful is logged. For example, the control circuit can log the indication that the test was not successful. In some embodiments, the control circuit can cause further actions to be performed if the test was not successful. For example, the control circuit can cause the test to be rerun, a variation of the test to be rerun in an attempt to troubleshoot or isolate an error, transmit a notification indicating that the test was not successful, etc. Additionally, the indication that the test was not successful can include a reason why the test was not successful.

As previously discussed at decision diamond 312, if the test is successful, the flow continues at block 316. At block 316, an indication that the test was successful is logged. For example, the control circuit can log the indication that the test was successful. The indication that the test was successful, as well as indications that tests were not successful, can be logged in a database or other data structure. Additionally, the indication that the test was successful can include a reason why the test was successful.

While the testing systems described herein are described as using cards, embodiments are not so limited. That is, transaction types other than traditional card transactions can be tested using the system described herein. For example, transactions with computers, telephones, tablets, watches, rings, etc. can be tested using embodiments of the system described herein.

In some embodiments, a system comprises an automated robotic testing device, the automated robotic testing device configured to retrieve, based on an indication of a selected card, the selected card from a physical media library, interact, via the selected card, with a point-of-sale terminal, the physical media library configured to hold a plurality of cards, the point-of-sale terminal communicatively coupled to a financial network and configured to receive from the selected card, information associated with the selected card, and transmit, via the financial network to an external banking institution, the information associated with the selected card, and a control circuit configured to determine, based on a transaction type, the selected card, transmit, to the automated robotic testing device, the indication of the selected card, receive, from the external banking institution in response to the transmission of the information associated with the selected card, one of an authorization and a lack of authorization, in response to receipt of the authorization, cause the transaction to be completed, in response to receipt of the lack of authorization, cause the transaction to be voided, determine whether a test associated with the transaction was successful, and log an indication of whether the test was successful.

In some embodiments, an apparatus and a corresponding method performed by the apparatus comprises determining, based on a transaction type, a selected card, transmitting, to an automated testing device, an indication of the selected card, retrieving, by the automated testing device based on the indication of the selected card, the selected card from a physical media library, interacting, by the automated testing device via the card, with a point-of-sale terminal, receiving, via the point-of-sale terminal, receiving, via the point-of-sale terminal, information associated with the selected card, transmitting, by the point-of-sale terminal via a financial network to an external banking institution, the information associated with the selected card, receiving, from the external banking institution in response to the transmitting the information associated with the selected card, one of an authorization and a lack of authorization, in response to receiving the authorization, causing the transaction to be completed, in response to receiving the lack of authorization, causing the transaction to be voided, determining whether a test associated with the transaction was successful, and logging an indication of whether the test was successful.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for testing a retail financial system transaction, the system comprising:
    an automated robotic testing device, the automated robotic testing device configured to:
        retrieve, based on an indication of a selected card, the selected card from a physical media library;
        interact, via the selected card, with a point-of-sale terminal;
    the physical media library configured to hold a plurality of cards;
    the point-of-sale terminal communicatively coupled to a financial network and configured to;
        receive from the selected card, information associated with the selected card; and
        transmit, via the financial network to an external banking institution, the information associated with the selected card; and
    a control circuit configured to:
        determine, based on a transaction type, the selected card;
        transmit, to the automated robotic testing device, the indication of the selected card;
        receive, from the external banking institution in response to the transmission of the information associated with the selected card, one of an authorization and a lack of authorization;
        in response to receipt of the authorization, complete the transaction, wherein the transaction is a live transaction, and wherein completion of the transaction results in an account associated with the selected card being charged by the external banking institution;
        in response to receipt of the lack of authorization, cause the transaction to be voided;
        determine whether a test associated with the transaction was successful; and
        log an indication of whether the test was successful.

2. The system of claim 1, wherein the type of transaction is based on one or more of a credit card transaction, a debit card transaction, a gift card transaction, a bank, verification required by a transaction, an input type, and a geographic location.

3. The system of claim 1, wherein the automated testing device includes at least one end effector configured to grasp the selected card.

4. The system of claim 1, wherein the control circuit is further configured to:
    select, based on the information associated with the selected card, the external banking institution.

5. The system of claim 1, wherein completion of the transaction results in a transfer of funds from the external banking institution to a retailer associated with the system for testing a retail financial system transaction.

6. The system of claim 1, wherein the selected card includes two or more cards.

7. The system of claim 1, wherein the automated testing device interacts with the point-of-sale terminal via the selected card by one or more of swiping the selected card, dipping the selected card, and tapping the selected card.

8. The system of claim 1, wherein the automated testing device is further configured to:
    interact with the point-of-sale device via one or more of hard buttons and soft buttons.

9. The system of claim 1, wherein the external banking institution and the automated robotic testing device are operated by different entities.

10. The system of claim 1, wherein the selected card is capable of being used to purchase one or more of goods and services.

11. A method for testing a retail financial system transaction, the method comprising:
    determining, by a control circuit based on a transaction type, a selected card;
    transmitting, by the control circuit to an automated testing device, an indication of the selected card;
    retrieving, by the automated robotic testing device based on the indication of the selected card, the selected card from a physical media library, wherein the physical media library is configured to hold a plurality of cards;

interacting, by the automated robotic testing device via the selected card, with a point-of-sale terminal;

receiving, via the point-of-sale terminal, information associated with the selected card;

transmitting, by the point-of-sale terminal via a financial network to an external banking institution, the information associated with the selected card;

receiving, by the control circuit from the external banking institution in response to the transmitting the information associated with the selected card, one of an authorization and a lack of authorization;

in response to receiving the authorization, completing, by the control circuit, the transaction, wherein the transaction is a live transaction, and wherein completion of the transaction results in an account associated with the selected card being charged by the external banking institution;

in response to receiving the lack of authorization, causing, by the control circuit, the transaction to be voided;

determining, by the control circuit, whether a test associated with the transaction was successful; and logging, by the control circuit, an indication of whether the test was successful.

12. The method of claim 11, wherein the type of transaction is based on one or more of a credit card transaction, a debit card transaction, a gift card transaction, a bank, verification required by a transaction, an input type, and a geographic location.

13. The method of claim 11, further comprising:
grasping, via an end effector of the automated robotic testing device, the selected card.

14. The method of claim 11, further comprising:
selecting, based on the information associated with the selected card, the external banking institution.

15. The method of claim 11 wherein completion of the transaction results in a transfer of funds from the external banking institution to a retailer associated with the system for testing a retail financial system transaction.

16. The method of claim 11, wherein the selected card includes two or more cards.

17. The method of claim 11, wherein the automated robotic testing device interacts with the point-of-sale terminal via the selected card by one or more of swiping the selected card, dipping the selected card, and tapping the selected card.

18. The method of claim 11, further comprising:
interacting, via the automated robotic testing device, with the point-of-sale device via one or more of hard buttons and soft buttons.

19. The method of claim 11, wherein the external banking institution and the automated robotic testing device are operated by different entities.

20. The method of claim 11, wherein the selected card is capable of being used to purchase one or more of goods and services.

* * * * *